US008522348B2

(12) United States Patent
Chen et al.

(10) Patent No.: US 8,522,348 B2
(45) Date of Patent: Aug. 27, 2013

(54) MATCHING WITH A LARGE VULNERABILITY SIGNATURE RULESET FOR HIGH PERFORMANCE NETWORK DEFENSE

(75) Inventors: Yan Chen, Northfield, IL (US); Zhichun Li, Evanston, IL (US); Gao Xia, Beijing (CN); Bin Liu, Beijing (CN)

(73) Assignee: Northwestern University, Evanston, IL (US)

( * ) Notice: Subject to any disclaimer, the term of this patent is extended or adjusted under 35 U.S.C. 154(b) by 267 days.

(21) Appl. No.: 12/846,541

(22) Filed: Jul. 29, 2010

(65) Prior Publication Data

US 2011/0030057 A1 Feb. 3, 2011

Related U.S. Application Data

(60) Provisional application No. 61/229,535, filed on Jul. 29, 2009.

(51) Int. Cl.
*G06F 11/00* (2006.01)
(52) U.S. Cl.
USPC .......................................................... 726/23
(58) Field of Classification Search
USPC .......................................................... 726/23
See application file for complete search history.

(56) References Cited

U.S. PATENT DOCUMENTS 7,308,715 B2 12/2007 Gupta et al.
2005/0216770 A1 9/2005 Rowett et al.

OTHER PUBLICATIONS

Kruegel, "Using Decision trees to Improve Signature-based Intrusion Detection."*
Pang et al., "binpac: A yacc for Writing Application Protocol Parsers," 2006.*
Fang Yu et al., "Fast and Memory-Efficient Regular Expression Matching for Deep Packet Inspection," 2006.*

(Continued)

*Primary Examiner* — Andrew Georgandellis
(74) *Attorney, Agent, or Firm* — Hanley, Flight and Zimmerman, LLC

(57) ABSTRACT

Systems, methods, and apparatus are provided for vulnerability signature based Network Intrusion Detection and/or Prevention which achieves high throughput comparable to that of the state-of-the-art regex-based systems while offering improved accuracy. A candidate selection algorithm efficiently matches thousands of vulnerability signatures simultaneously using a small amount of memory. A parsing transition state machine achieves fast protocol parsing. Certain examples provide a computer-implemented method for network intrusion detection. The method includes capturing a data message and invoking a protocol parser to parse the data message. The method also includes matching the parsed data message against a plurality of vulnerability signatures in parallel using a candidate selection algorithm and detecting an unwanted network intrusion based on an outcome of the matching.

20 Claims, 8 Drawing Sheets

(56) References Cited

OTHER PUBLICATIONS

Lincoln Laboratory, Massachusetts Institute of Technology, "1998 DARPA Intrusion Detection Evaluation Data Set," http://www.ll.mit.edu/mission/communications/ist/corpora/ideval/data/1998data.html, retrieved Jun. 11, 2010 (2 pages).
The Mitre Corporation, "CVE Identifiers," http://cve.mitre.org/cve/identifiers/index.html, retrieved Jun. 11, 2010 (2 pages).
Edgewall Software, Inc., "Tcpreplay," http://tcpreplay.synfin.net/trac/, retrieved Jun. 11, 2010 (1 page).
Tenable Network Security, "Nessus Vulnerability Scanner," http://www.nessus.org, retrieved Jun. 11, 2010 (2 pages).
Baboescu et al., "Scalable Packet Classification," pp. 199-210, in proceedings of 2001 ACM/SIGCOMM, Aug. 27-31, 2001 (12 pages).
Becchi et al., "Extending Finite Automata to Efficiently Match Perl-Compatible Regular Expressions," pp. 50-59, in proceedings of 2008 Conference on Emerging Networking Experiments and Technologies, Dec. 9-12, 2008 (12 pages).
Becchi et al., "Efficient regular expression evaluation: Theory to practice," pp. 50-59, in proceedings of 2008 ACM/IEEE Symposium on Architectures for Networking and Communications Systems, Nov. 6-7, 2008 (10 pages).
Becchi et al., "Extending Finite Automata to Efficiently Match Perl-Compatible Regular Expressions," in proceedings of 2008 Conference on Emerging Networking Experiments and Technologies, Dec. 9-12, 2008 (12 pages).
Borisov et al., "A Generic Application-Level Protocol Analyzer and its Language," in proceedings of 2007 Network and Distributed System Security Symposium, Feb. 28-Mar. 2, 2007 (13 pages).
Brumley et al., "Towards Automatic Generation of Vulnerability-Based Signatures," pp. 2-16, in proceedings of 2006 IEEE Symposium on Security and Privacy, May 21-24, 2006 (15 pages).
Costa et al., "Vigilante: End-to-End Containment of Internet Worms," pp. 133-147, in proceedings of 2005 ACM Symposium on Operating Systems Principles, Oct. 23-26, 2005 (15 pages).
Cui et al., "ShieldGen: Automatic Data Patch Generation for Unknown Vulnerabilities with Informed Probing," pp. 252-266, in proceedings of 2007 IEEE Symposium on Security and Privacy, May 20-23, 2007 (15 pages).
Eckmann et al., "STATL: An Attack Language for State-based Intrusion Detection," in Journal of Computer Security, vol. 10, No. 1, 2002 (16 pages).
Gupta et al., "Packet Classification on Multiple Fields," pp. 147-160, in proceedings of 1999 ACM/SIGCOMM, Aug. 30-Sep. 3, 1999 (14 pages).
Gupta et al., "Packet Classification using Hierarchical Intelligent Cuttings," IEEE Micro, vol. 20, No. 1, pp. 34-41, Jan./Feb. 2000 (9 pages).
Ilgun et al, "State Transition Analysis: A Rule-Based Intrusion Detection Approach," IEEE Transactions on Software Engineering, vol. 21, No. 3, pp. 181-199, Mar. 1995 (19 pages).
Kruegel et al., "Stateful Intrusion Detection for High-Speed Networks," pp. 285-296, in proceedings of 2002 IEEE Symposium on Security and Privacy, May 12-15, 2002 (9 pages).
Kumar et al., "Advanced Algorithms for Fast and Scalable Deep Packet Inspection," pp. 81-92, in proceedings of 2006 ACM/IEEE Symposium on Architectures for Networking and Communications Systems, Dec. 3-5, 2006 (11 pages).
Kumar et al., "Curing Regular Expressions Matching Algorithms from Insomnia, Amnesia, and Acalculia," pp. 81-92, in proceedings of 2007 ACM/IEEE Symposium on Architectures for Networking and Communications Systems, Dec. 3-4, 2007 (10 pages).
Kumar et al., "Algorithms to Accelerate Multiple Regular Expression Matching for Deep Packet Inspection," pp. 339-350, in proceedings of 2006 ACM/SIGCOMM, Sep. 11-15, 2006 (12 pages).
Lakshman et al., "High-Speed Policy-Based Packet Forwarding Using Efficient Multi-Dimensional Range Matching," pp. 203-214, in proceedings of 1998 ACM/SIGCOMM, Aug. 31-Sep. 4, 1998 (12 pages).
O'Neill, "Current Trends in IDS and IPS," Network Security Journal, http://www.networksecurityjournal.com/features/current-trends-in-ids-ips-052907/, May 29, 2007 (1 page).
Liang et al., "Fast and Automated Generation of Attack Signatures: A Basis for Building Self-Protecting Servers," pp. 213-222, in proceedings of 2005 ACM Conference on Computer and Communications Security, Nov. 7-11, 2005 (10 pages).
Lindqvist et al., "Detecting Computer and Network Misuse Through the Production-Based Expert System Toolset (P-BEST)," pp. 146-161, in proceedings of 1999 IEEE Symposium on Security and Privacy, May 9-12, 1999 (16 pages).
Microsoft Corporation, "Microsoft Security Bulletin MS03-026," http://www.microsoft.com/technet/security/bulletin/MS03-02.mspx, retrieved on Jun. 10, 2010 (3 pages).
Pang et al., "binpac: A yacc for Writing Application Protocol Parsers," pp. 289-300, in proceedings of 2006 ACM/SIGCOMM Internet Measurement Conference, Oct. 25-27, 2006 (12 pages).
Paxson, "Bro: A System for Detecting Network Intruders in Real-Time," Computer Networks, vol. 31, issues 23-24, pp. 2435-2463, Dec. 14, 1999 (30 pages).
Porras et al., "EMERALD: Event Monitoring Enabling Responses to Anomalous Live Disturbances," in proceedings of 1997 National Information Systems Security Conference, Oct. 9, 1997 (13 pages).
Reis et al., "BrowserShield: Vulnerability-Driven Filtering of Dynamic HTML," pp. 61-74, in proceedings of 2006 Operating Systems Design and Implementation, Oct. 9, 1997 (14 pages).
Sourcefire, Inc., "Snort," http://www.snort.org/, retrieved on Jun. 11, 2010 (3 pages).
Schear et al., "High-Speed Matching of Vulnerability Signatures," pp. 155-174, proceedings of 2008 international symposium on Recent Advances in Intrusion Detection, Sep. 15-17, 2008 (20 pages).
Shankar et al., "Active Mapping: Resisting NIDS Evasion without Altering Traffic," pp. 44-61, in proceedings of 2003 IEEE Symposium on Security and Privacy, May 11-14, 2003 (18 pages).
Singh et al., "Packet Classification Using Multidimensional Cutting," pp. 213-224, in proceedings of 2003 ACM/SIGCOMM, Aug. 25-29, 2003 (12 pages).
Smith et al., "XFA: Faster Signature Matching With Extended Automata," pp. 187-201, in proceedings of 2008 IEEE Symposium on Security and Privacy, May 18-21, 2008 (15 pages).
Smith et al., "Deflating the Big Bang: Fast and Scalable Deep Packet Inspection with Extended Finite Automata," pp. 207-218, proceedings of 2008 ACM/SIGCOMM, Aug. 17-22, 2008 (12 pages).
Sommer et al., "Enhancing Byte-Level Network Intrusion Detection Signatures with Context," pp. 262-271, in proceedings of 2003 ACM Conference on Computer and Communications Security, Oct. 27-30, 2003 (10 pages).
Srinivasan et al., "Packet Classication using Tuple Space Search," pp. 135-146, proceedings of 1999 ACM/SIGCOMM, Aug. 30-Sep. 3, 1999 (12 pages).
Taylor, "Survey and Taxonomy of Packet Classification Techniques," ACM Computing Surveys, vol. 37, issue 3, pp. 238-275, Sep. 2005 (38 pages).
Vigna et al., "NetSTAT: A Network-based Intrusion Detection Approach," in Journal of Computer Security, vol. 7, No. 1, 1999 (10 pages).
Wang et al., "Shield: Vulnerability-Driven Network Filters for Preventing Known Vulnerability Exploits," pp. 193-204, proceedings of 2004 ACM/SIGCOMM, Aug. 30-Sep. 3, 2004 (12 pages).
Yu et al., "Fast and Memory-Efficient Regular Expression Matching for Deep Packet Inspection," pp. 93-102, in proceedings of 2006 ACM/IEEE Symposium on Architectures for Networking and Communications Systems, Dec. 3-5, 2006 (10 pages).

\* cited by examiner

```
BIND:
rpc_vers==5 && prc_vers_minor==1
&& packed_drep=='\x10\x00\x00\x00'
&& context[0].abstract_syntax.uuid
   ==UUID_IRemoteActivation
BIND-ACK:
rpc_vers==5 && rpc_vers_minor==1
CALL:
rpc_vers==5 && rpc_vers_minor==1
&& packed_drep=='\x10\x00\x00\x00'
&& opnum==0x00 && stub.RAbody.actual_length>=40
&& matchRE(stub.RAbody.buffer,                s
   /^\x5c\x00\x5c\x00/)                        a
```

(a) Sequential  (b) Branch  (c) Loop  (d) Derive
     610          620         630        640

MATCHING WITH A LARGE VULNERABILITY SIGNATURE RULESET FOR HIGH PERFORMANCE NETWORK DEFENSE

CROSS-REFERENCE TO RELATED APPLICATIONS

The present application claims priority to U.S. Provisional Application No. 61/229,535, filed on Jul. 29, 2009, which is herein incorporated by reference in its entirety.

STATEMENT REGARDING FEDERALLY SPONSORED RESEARCH OR DEVELOPMENT

This invention was made with government support under Grant No. CNS-0831508 awarded by the National Science Foundation. The government has certain rights in the invention.

FIELD OF THE INVENTION

The presently described technology generally relates to network defense. In particular, the presently described technology relates to systems, methods, and apparatus for network instruction detection and/or prevention.

BACKGROUND

Computers and software running on computers include vulnerabilities that are often exploited by computer hackers as well as by malicious programmers seeking to monitor and exploit computer user habits and preferences. Computer hackers also seek to disrupt businesses by interfering with or blocking online customer access and activity.

Keeping networks safe is a challenge for the Internet. The outbreak of the Conficker worm/botnet at the end of 2008 shows that remote exploits are still a major threat to the Internet today.

SUMMARY

Certain examples provide a computer-implemented method for network intrusion detection. The method includes capturing a data message and invoking a protocol parser to parse the data message. The method also includes matching the parsed data message against a plurality of vulnerability signatures in parallel using a candidate selection algorithm and detecting an unwanted network intrusion based on an outcome of the matching.

Certain examples provide a vulnerability-based network intrusion detection/prevention system. The system includes a protocol parser including a parsing state machine to parse a protocol data unit according to an associated application protocol specification. The system also includes a matching engine including plurality of matchers each to match one of a plurality of vulnerability signatures to the protocol data unit in parallel. The matching engine is to combine results from the plurality of matchers to form a set of rule candidates to identify and detect an unwanted network intrusion based on an outcome of the matching.

Certain examples provide a tangible computer-readable storage medium having a set of instructions stored thereon which, when executed, instruct a processor to implement a vulnerability-based network intrusion detection system. The system includes a protocol parser including a parsing state machine to parse a protocol data unit according to an associated application protocol specification. The system also includes a matching engine including plurality of matchers each to match one of a plurality of vulnerability signatures to the protocol data unit in parallel. The matching engine is to combine results from the plurality of matchers to form a set of rule candidates to identify and detect an unwanted network intrusion based on an outcome of the matching.

Figures 1, 2:
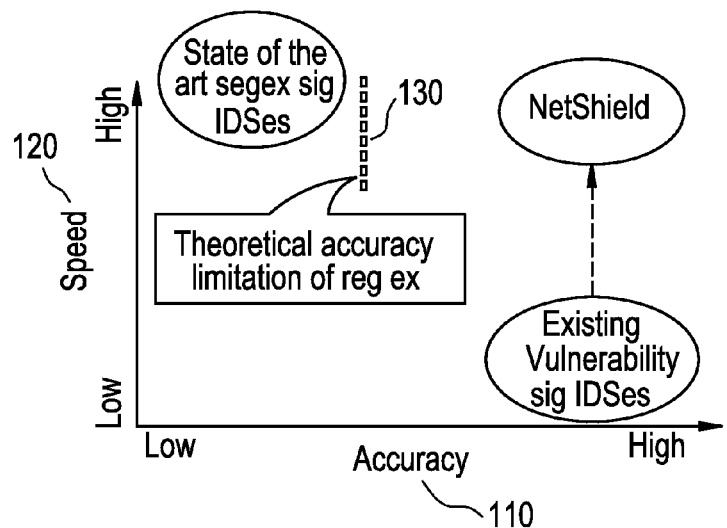
FIG. 1 illustrates an example comparing NetShield with existing approaches.
FIG. 2 illustrates an example vulnerability signature.

The following detailed description of certain embodiments will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EMBODIMENTS

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components can be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, in at least one example, at least one of the elements is hereby expressly defined to include a tangible medium such as a memory, DVD, Blu-ray, CD, etc. storing the software and/or firmware.

Network level defense mechanisms are important to provide security for a network as a whole, including the users who do not apply host-based schemes for various reasons (e.g., reliability, overhead, conflicts, etc.). Three challenges need to be addressed for network level defense mechanisms.

First, the mechanisms should be highly accurate. Second, the mechanisms should be scalable to the high speed networks with a large number of users. Third, the mechanisms should be able to respond quickly to emerging threats. Certain examples provide a high performance network defense and forensic system that achieves high throughput comparable to regular expression based systems while offering much better accuracy through parallel matching of vulnerability signatures and a fast protocol parsing state machine.

Vulnerabilities that can be exploited remotely are the result of faulty program logic. They may be triggered when the program handles inputs from networks, for example. In theory, if a necessary and sufficient condition to trigger the vulnerability is available, it can be used as a classifier to separate a malicious input from benign input. Protocol semantic information is useful for specifying such condition. Based on the above observation, Wang et al. proposed a vulnerability signature. Essentially, a vulnerability signature is a set of symbolic predicates based on the protocol semantic information.

At a high level, a vulnerability signature is not specific to details, such as whether an exploit successfully hijacks control of a program, but instead helps evaluate whether executing an input will (potentially) result in an unsafe execution state. In some examples, a vulnerability signature matches a set of inputs (strings) which satisfy a vulnerability condition in the program. While communication protocols can be examined for either semantics or syntax, vulnerability signatures facilitate a semantics-based analysis.

To recover the protocol semantic information, input is parsed. In addition, a protocol state machine (also referred to as a vulnerability state machine) is used to adjust protocol states when sending/receiving different protocol data units (PDUs). PDUs are the atomic data units that are sent between two application endpoints. A PDU can be represented as a parse tree with leaf nodes that include integers or strings. A PDU can be dissected into multiple protocol fields. Here, a field indicates a sub-sequence of bytes inside the PDU with certain semantic meaning or functionality. In certain examples, a vulnerability signature can be mostly based on leaf nodes. In certain examples, fields related to vulnerability signatures are parsed.

For a multi-PDU protocol, a protocol parser associates the related PDUs with different sessions. The PDUs in one session correspond to a single instance of the protocol state machine. Predicates of vulnerability signatures are defined on the sequence of PDUs in one session, one for each PDU. The predicates are written as a set of conditions based on the PDU's protocol fields. If all of the predicates of the vulnerability signature are true, the signature is matched.

As an example, consider the MS03-026 vulnerability exploited by the Blaster worm. The vulnerability is a stack buffer overrun vulnerability in the WINRPC protocol. WINRPC is a stateful protocol. A typical WINRPC call starts with a BIND PDU from the client side, asking to bind to a particular application programming interface (API). A server receives the request and responds with a bind acknowledge (BIND-ACK) PDU for acknowledgement. After that, the client issues a remote function call (CALL PDU) using opnum as an identifier (ID) for the function, followed by the required parameters. If the length of the buffer actual length is longer than 40, a buffer overrun will be triggered.

FIG. 2 shows a corresponding vulnerability signature for MS03-026. Since the signature captures the vulnerability conditions, it can stop the Blaster worm in addition to all possible exploits (including future ones) of this vulnerability.

Accuracy and speed are two metrics used to evaluate Network Intrusion Detection/Prevention Systems (NIDS/NIPSes) and associated methods. Due to emerging polymorphic attacks and an inability of regular expressions (regexes) in many cases to capture vulnerability conditions accurately (e.g., polymorphic attacks may not have exact regular expression based signatures), the accuracy of existing regex-based NIDS/NIPS systems can be questioned, especially with respect to unknown anomalies or intrusions. Additionally, it can be difficult to differentiate malicious events from unintentional anomalies. In contrast, vulnerability signatures (e.g., data patches) can describe the vulnerability conditions and achieve better accuracy. However, when applying vulnerability signatures to high speed NIDS/NIPS with a large ruleset, it can be challenging to efficiently match them.

Snort is an open source NIDS. It uses the PCRE library for regex matching guarded by a string matching based prefilter. However, the worst case performance is mainly decided by the PCRE library, which is a NFA based approach and quite slow. Bro is another NIDS with a regex signature engine. It can also access semantic information with an expressive policy language, which is close to a general programming language. As a tradeoff, it is hard to optimize its speed for detecting a large number of vulnerabilities. As discussed herein, it is difficult to extend regex approaches to handle vulnerability signatures.

While string matching (e.g., to locate an invariant string close to a required field to achieve fast but approximate parsing) has been proposed, approximate parsing potentially may introduce false positives. For a matching engine, string matching considers a small number of vulnerability signatures and uses sequential matching. It also remains unknown whether a strong matching approach can handle a large number of vulnerability signatures. In certain examples, all required fields are accurately parsed with a similar or better speedup ratio to BinPAC on text and binary protocols.

An SPMSM problem can be formulated in relation to a classical packet classification problem but is more complex. Both problems are defined on a set of matching dimensions, and allow wildcards. Packet classification techniques have been into four categories: exhaustive search, decision tree, tuple space and decomposition. Unfortunately, none of them can be directly applied to the SPMSM problem.

Ternary Content Addressable Memory (TCAM) uses brute-force hardware parallelism to achieve fast exhaustive search for packet classification. However, it remains unknown how to apply TCAM for the SPMSM problem. For example, currently there are no efficient ways to encode regexes used in vulnerability signatures into TCAM. Decision tree algorithms such as HiCuts and HyperCuts involve interleaving different dimensions (e.g., combining them as a big tree), which is difficult when dealing with vulnerability signatures. Moreover, a large amount of memory is involved when being used with a large number of wildcards.

Tuple Space based algorithms exploit the fact that the five tuples in packet classification are all integers so that the tuple space is small. For vulnerability signatures with many long string fields, the tuple space can be very large. Also, it cannot handle regex matching which is required by vulnerability signatures.

Decomposition based approaches are not suitable either. For example, recursive flow classification (RFC) does not work with regular expression matchers. Bit vector approaches involve large memory (O(N)) per connection and high computation overhead.

In certain examples, a vulnerability signature-based parsing and matching engine is provided. The engine is referred to as NetShield herein. NetShield can achieve multi-gigabit throughout with improved accuracy. A candidate selection algorithm more efficiently matches thousands of vulnerability signatures simultaneously (or at least substantially simultaneously with a system delay) involving a small amount of memory. An automatic lightweight parsing state machine achieves fast protocol parsing. For example, experimental results show that a core engine of NetShield achieves at least 1.9+Gbps signature matching throughput on a 3.8 GHz single-core personal computer and can scale-up to at least 11+Gbps under an 8-core machine for 794 Hypertext Transfer Protocol (HTTP) vulnerability signatures.

Keeping networks safe is a challenge for the Internet. The outbreak of the Conficker worm/botnet at the end of 2008 shows that remote exploits are still a major threat to the Internet today. The Conficker worm mainly exploited a WIN-RPC remote code execution vulnerability (MS08-067), infected 9-15 million hosts and turned the majority of them into bots. For such attacks, network-based Intrusion Detection/Prevention Systems (NIDS/NIPSes) are useful because they protect the enterprise or an Internet Service Provider (ISP) as a whole, including the users who do not apply patches or host-based defense schemes for various reasons (reliability, overhead, conflicts, etc.). Operating on routers/gateways, NIDS/NIPS can stop attacks such as the Conficker worm from spreading.

Accuracy can be important for NIDs/NIPS, especially for a NIPS configured as an inline device that throttles connections when being identified as malicious by matching pre-defined signatures. Such a configuration involves signatures accurate enough so that the NIPS can drop packets with confidence. Additionally, NIDS/NIPSes should maintain a high speed. Most modern enterprises today have 1 Gbps links and gradually move to 10 Gbps. For high speed NIDS/NIPSes, a de facto standard approach is to employ regular expression (regex) based matching engines. Vulnerability signatures have not been used in NIDS/NIPSes due to low matching efficiency.

Regexes can be combined and matched simultaneously (or at least substantially simultaneously accounting for system/processing delay) in a single pass over an input. To keep up with line speed, most commercial NIDS/NIPSes (e.g., products from Cisco and Juniper), as well as some open source NIDS/NIPSes (e.g., Bro), use a regex-based matching engine. In such regex-based approaches, the signatures are represented by regexes. The content of a connection is treated as a string and is matched to the regex signatures simultaneously (or at least substantially simultaneously accounting for system/processing delay). Some research efforts assume a regex can provide enough accuracy and focus on increasing its speed while reducing the memory occupation.

However, their assumption that regexes can provide enough accuracy is questionable. Attackers have already developed polymorphic and metamorphic variations to evade detection. In many cases, to express the vulnerability conditions, protocol/application semantics and states are recovered, which involves context-sensitive parsing. Even context-free languages may not be enough. Therefore, theoretically, regexes are infeasible to fully avoid false positives and false negatives. In practice, the limitation of regexes does cause false positive and false negatives. For example, due to the complexity of the NetBIOS/SMB/WINRPC protocol stack, it is almost impossible to write an accurate regex signature to detect the polymorphic versions of the Blaster worm or the recent Conficker worm. Other similar cases are found in different protocols, e.g., HTTP and DNS.

In comparison, a concept of vulnerability signatures (also referred to as data patches) has been proposed to exactly describe the vulnerability condition and achieve better accuracy than regex-based approaches. Based on a more thorough understanding of both the network protocol and the application context, leveraging semantic information, a vulnerability signature describes all the possible paths which lead to a vulnerability that can be exploited over a network.

Most previous work on vulnerability signatures focuses on automated vulnerability signature generation. However, how to match a large number of vulnerability signatures efficiently has not been well studied. Existing approaches use sequential matching, i.e., matching signatures one by one, which leads to low speed. An underlying reason is that vulnerability signatures are symbolic predicates based on protocol/application semantic information, which is very different from strings and regexes in nature. This difference makes matching multiple vulnerability signatures simultaneously a very challenging job.

However, since a high-speed NIDS/NIPS should protect a large number for diverse hosts, it usually has a large signature ruleset to cover all possible vulnerabilities of those hosts. For example, Snort has more than 6,000 signatures. Cisco IPS also has about 2,000 signatures. For both systems, even for a single protocol, such as HTTP, there are hundreds or even thousands of signatures. Therefore, matching a large vulnerability signature ruleset at high speed is a very practical requirement.

In FIG. 1, an example NetShield approach is compared with existing approaches in terms of accuracy 110 and speed 120. Due to a theoretical limitation on accuracy 130, to improve the accuracy of a regex-based approach is extremely hard, if not impossible. On the other hand, the existing vulnerability signature approaches with sequential matching cause low throughput. A challenge is how to speed up vulnerability signature matching with large vulnerability rulesets. Another challenge is to parse the traffic and to recover the protocol semantic information fast enough for signature matching.

Figure 3:
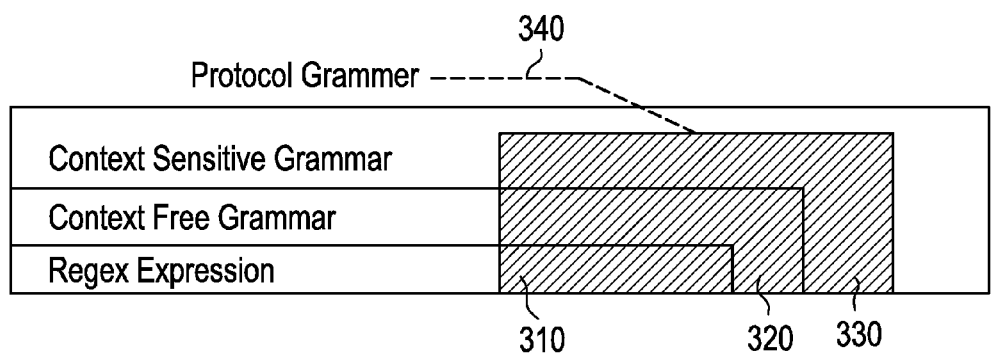
FIG. 3 illustrates relationships of different example grammars.

Vulnerability signatures are accurate because they reflect the semantic context of vulnerabilities. However, can vulnerability signatures be expressed in regexes? The answer is no for at least two reasons. First, from a theoretical perspective, content sensitive parsing is used to recover protocol semantics. However, as shown in FIG. 3, the regex language is a special subset of context free language. Thus, its limited expressiveness determines that it cannot parse complex protocols. Thus vulnerability signatures cannot be converted based on protocol fields to regexes. As depicted in FIG. 3, a regex expression 310 is a subset of a context free grammar 320, which is a subset of a context sensitive grammar 330. A protocol grammar is an example of a context sensitive grammar 330.

Second, from a practical perspective, real world protocols are sophisticated enough to render regex incapable. For example, the hypertext transfer protocol (HTTP) encodes a length of chunked HTTP body in another field. Regexes fail to identify the boundary of the body in this case. In the domain name service (DNS) protocol, DNS labels can be either a string with variable length or a pointer. Unfortunately, regexes cannot de-reference a pointer. There are similar cases in secure sockets layer (SSL), simple network management protocol (SNMP), and many other protocols.

Not only is protocol parsing difficult to achieve using regexes, but also the nature of vulnerability signature matching is different. Regexes assume the input is a single raw byte string. In contrast, vulnerability signatures need to match multiple protocol fields in different data types (e.g., number or strings) and combine the matching results to make a decision. For multi-PDU protocols, the protocol state machine adds another layer of complexity.

Regexes are useful for signature matching. Research on improving the matching performance of regexes will benefit vulnerability signature-based solutions. In fact, vulnerability signatures may also involve regex matching as shown in the last predicate in FIG. 2. However, relying on regexes is not enough. In practice, NIDS/NIPS vendors also realize this problem and add limited semantic processing power to their products. For example, Snort provides uricontent to annotate the uniform resource indicator (URI) field, and preliminary protocol parsing primitives (byte_test and byte_jump). However, these add-ons are relatively ad-hoc and work as "patches" to the NIDS/NIPS systems. They are still limited by the regex engines and cannot utilize the full benefit of vulnerability signatures. As described herein, a systematic and clean slate design can be used for protocol parsing and vulnerability signature matching.

Certain examples provide a vulnerability-based NIDS/NIPS system and associated method (referred to herein as NetShield). NetShield obtains high throughput comparable to that of the state-of-the-art regex-based NIDS/NIPS while offering better accuracy. In certain examples, an efficient multiple signature matching scheme is used for a large number of vulnerability signatures. By formulating a multiple vulnerability signature matching problem, a tabular presentation of vulnerability rulesets is devised. Candidate Selection (CS) is provided to match multiple vulnerability signatures simultaneously (or at least substantially simultaneously accounting for a system processing/memory access delay, for example). CS enables high-speed massive vulnerability signature matching with a small memory requirement. NetShield provides a first effort to formulate and solve the multiple vulnerability signature matching problem.

In certain examples, fast, stream-fashioned lightweight parsing is provided. In certain examples, buffering and parse tree traversal are not necessary when the parsing is solely for signature matching. Additionally, certain examples reduce or eliminate the dominating overhead that is inherent in existing approaches. Protocol semantics can be used to express vulnerability. An automatic parsing state machine generator, referred to herein as UltraPAC, is provided. The protocol parsing state machine can include predicates for each state. The generated parsing state machine can accurately parse out fields, helping to avoid unnecessary cost. Evaluation with real trace shows UltraPAC parser is about 3-12 times faster than the BinPAC parser.

By analyzing the vulnerabilities that are targeted by the Snort ruleset, vulnerability signatures can be created for those vulnerabilities, for example. Using NetShield, experimental results show that, on a single-core 3.8 Ghz personal computer, the core engine can achieve 6.7+Gbps parsing speed on HTTP, and 1.9+Gbps parsing plus matching speed for 794 HTTP vulnerability signatures with 2.3 MB memory for the matching data structures. On a 8-core machine, the matching throughput is increased to 11+Gbps.

Figure 4:
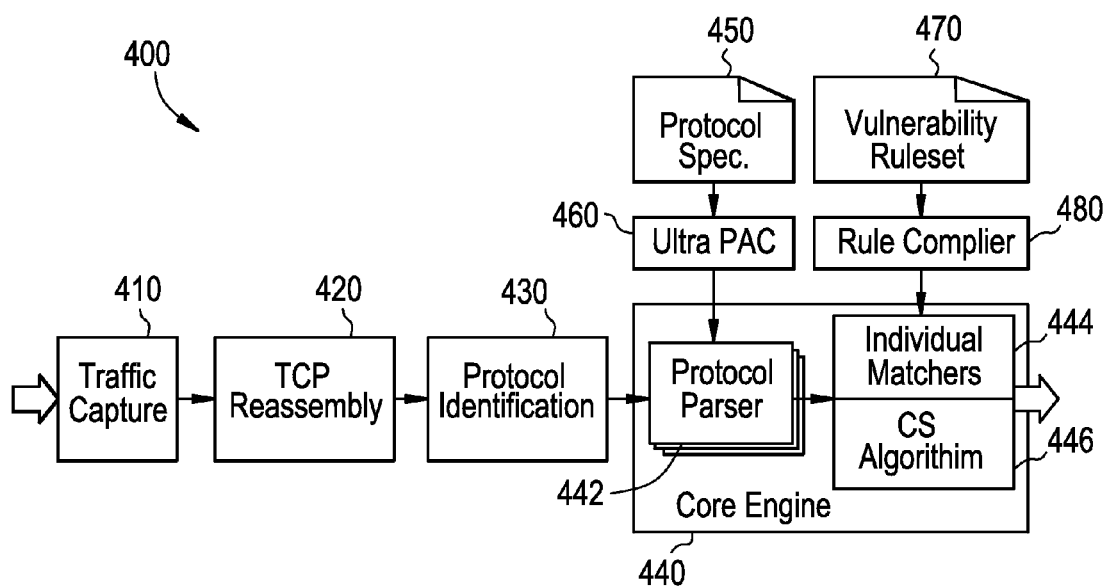
FIG. 4 illustrates an example system architecture.

FIG. 4 depicts an example framework 400 for NetShield. There are efficient hardware techniques for traffic sniffing or capture 410, TCP reassembly 420, and protocol identification 430 (e.g., classify the traffic to different application protocols). An efficient core engine 440 is designed for matching vulnerability signatures. For each application protocol, a corresponding protocol parser 442 is invoked, which is generated by an automated parser generator 460 (e.g., UltraPAC) from the protocol specification 450. Based on the protocol fields output from parsing, a matching engine 444 matches all the vulnerability signatures for the given protocol simultaneously (or at least substantially simultaneously given processing and/or memory access delay). The matching engine 444 receives input from a rule compiler 480 based on a vulnerability ruleset 470. In the example of FIG. 4, the protocol parser 442 and the matching engine 444 are tightly coupled and work in a pipelined fashion in conjunction with a candidate selection algorithm 446. Whenever a protocol field is parsed, it is sent to the matching engine 444 where an incremental matching process is invoked. The pipelined processing helps reduce the memory consumption, processing delay and maximize the throughput.

The vulnerability signature matching problem will now be described in more detail. To simplify the discussion, a single PDU multiple signature matching problem (SPMSM) is defined such that given a set of signature $S=\{S_1, S_2, \ldots\}$ and a PDU P, a solution is to find the signatures in S that match P. Once SPMSM has been solved, the solution can be extended to a multiple PDU case.

In some examples, a tabular signature representation is used. The tabular signature representation includes a set of signatures transformed into a two-dimensional table (referred to as a signature table). Using the table, multiple vulnerability signatures can be matched simultaneously.

Multiple vulnerability signature matching can be achieved in two phases or steps. First, signatures are normalized to only use && (AND). A signature that uses an || (OR) operator is split into multiple signatures. Second, the normalized signatures are converted to the signature table. Each unique two-tuple (<fieldname> <operator>) is a matching dimension (called a matcher), where <fieldname> is a protocol field and <operator> is the corresponding operator. For example, the (filename==) is a matcher defined by a filename field in an HTTP URI and the exact string matching operator. Different signatures may involve different right operands for the filename field, e.g., filename=="header.php"" or filename=="ads.cgi".

One exception is that some protocol fields may form an associative array (e.g., Perl Hash). For example, HTTP headers can be represented as name and value pairs, which can be treated as an associative array. First, the name of a header is to be matched. If it is matched, the value condition is then matched. Although it is possible to treat the header and value condition as separate matchers, treating them as a single matcher is easier since most of rules have binding relationships between the names and values.

For N signatures defined on K matchers, an N×K table is built. The table can be used for a single PDU and a multiple PDU case. A row represents a signature, a column represents a matcher, and a cell represents a right operand of the matcher on the signature. If the signature j does not depend on matcher i, a wildcard "*" is used to indicate in the cell. A simplified example is given in Table 1. This example includes five matchers on four protocol fields. Here, operator "==" indicates exact matching, operator "RE" indicates regex matching, and Operator "LEN" indicates string length checking VARS is the list of variable assignments (name and value pairs) in the HTTP URI, VARS and Headers can be treated as associative arrays; thus, they are four tuples.

A general multidimensional range search over N ranges in K dimensions (NKQUERY) has $\Omega((\log N)^{K-1})$ worst-case time with linear memory, or $O(N^K)$ memory for linear search time. This problem can be reduced to an SPMSM problem (e.g., runtime excluding construction time). Therefore, the SPMSM problem's worst case bound will be at least as bad as that of the NKQUERY problem. This implies that for the worst case rulesets it is impossible to have a fast linear time algorithm.

Since the worst case rulesets have bad theoretical results, the nature of real-world rulesets was studied, because, after all, the attackers do not have control over the vulnerabilities in a ruleset. Vulnerabilities are determined by the bugs in programs. To design an algorithm with good performance on real-world rulesets is still important.

After examining a protocol field against a given matcher for all signatures in a given ruleset, the signatures that match the protocol field on the matcher, except those including a wildcard, are labeled as candidates. For a real world vulnerability ruleset, most matchers are selective (e.g., producing small candidate sets).

The observation is made by studying real-world vulnerabilities, mainly the vulnerability signatures corresponding to Snort and Cisco rulesets. String-related matchers are selective, because strings used in signatures are usually long and unique. For number-related matchers, in most cases this observation still holds. However, it is not true for some matchers that are not crucial to the signatures and are used solely for reducing false positives (e.g., the matcher for checking the WINRPC version field). In other words, these matchers are not rule-based filters but are traffic-based filters. The protocol fields of such non-selective matchers usually take little space (e.g., four bytes or less) so that fields can be buffered and matched later.

Vulnerability signature matching includes several characteristics. For NIDSes/NIPSes, for example, when multiple rules match a single session, the reporting order of matched rules does not matter. This is different from firewall rules. A session can be very long (e.g., hundreds of KB) and involve multiple PDUs such that buffering the session as a whole is uneconomical. Moreover, since it is better to make a decision sooner, a PDU (or a partial PDU) can be parsed to match the signatures in a streamline fashion, rather than waiting for all the fields to be available together. Further, field dependencies as well as a large number of matchers and a large number of wildcards are to be handled. Additionally, vulnerability signatures involve different operations, such as integer range checking, string matching, and regex matching. The nature of these operations is different, so it is difficult to combine them together.

A Candidate Selection (CS) method is developed using a decomposition design to match each matcher separately and then combine the results based on observation(s) from real-world rulesets and characteristic(s) of vulnerability signature matching. During pre-computation, rule order and matcher order are determined. In some examples, given that most matchers are good rule filters, only some matching candidates are tracked for a connection. For each matcher, candidates for all the rules are searched simultaneously or substantially simultaneously (e.g., matched in parallel). Then candidates from different matchers are merged (e.g., are iteratively combined).

One approach is to use a bit-vector to encode matching results. However, for a large ruleset (e.g., 1000 signatures), 1000 bits (125 bytes) are involved per connection, which is memory inefficient. Since a NIDS/NIPS is to support a large number of concurrent flows, a bit-vector design involves a large memory. Additionally, a bit vector design may be subject to state holding attacks.

Alternatively, by exploiting rule order, CS "don't care" cases implicitly and thus only needs to record a small number of candidates for each matcher. Each matcher is matched separately upon the protocol field's arrival. Then the possible candidate rules are iteratively merged to produce a final result. The CS method provides good throughput and memory usage.

Using CS, a pre-computation is performed to decide rule order, matcher order, and runtime process. The pre-computation helps reduce overhead at runtime. While most matchers are effective, bad matchers can be buffered to change the matching order. String matchers are good, and most integer matchers are good. Protocol field arriving order is assumed to be the matching order when rule ordering is discussed below. After matching against them, only a small number of signatures can pass (e.g., candidates).

In pre-computation, a rule order is first determined based on a degree of freedom or flexibility in signature ID order. $M_i$ is used to denote an $i^{th}$ matcher (e.g., an $i^{th}$ column in a signature table). Rules that do not have a wildcard in $M_i$ are referred to as "the rules requiring $M_i$."

---

Algorithm 1 depicts a rule ordering process.
Algorithm 1 - RuleOrdering( )
R is the list of rules;
For $M_i$ in AllMatchers
   $RB_i \leftarrow$ the rules in R requiring $M_i$;
   $R \leftarrow R \leftarrow RB_i$;
Endfor
N R ← [ ];
For i from 1 to K append the rules in $RB_i$ to N R;
Return N R;

---

R is initialized as a complete list of rules. The process iterates over each matcher. In the $i^{th}$ iteration, the remaining rules in R have wildcards in all the previous matchers $M_1$ to $M_{i-1}$. All the remaining rules requiring $M_i$ to construct $RB_i$, which is the $i^{th}$ rule block (RB), are selected. The selected rules are removed from R before the next iteration starts. The $RB_i$ is concatenated to form a list of ordered rules. Table 1 shows the rules after rule ordering. The RB column is the rule block ID.

TABLE 1

A simplified example with nine HTTP signatures on five matchers (matching dimensions).

| Rule ID | RB | Matcher 1 Method == | Matcher 2 Filename == | Matcher 3 Filename RE | Matcher 4 VARS ==RE | Matcher 5 Headers ==LEN |
|---|---|---|---|---|---|---|
| 1 | 1 | DELETE | * | * | * | * |
| 2 | 1 | TRACE | * | * | * | * |
| 3 | 1 | POST | header.php | * | * | * |
| 4 | 2 | * | ads.cgi | * | name="file"; value ~ ".*\.\./" | * |
| 5 | 2 | * | awstats.pl | * | name="configdir"; value ~ ".*7C" | * |
| 6 | 2 | * | fp40reg.dll | * | * | name="host"; len(value)>300 |
| 7 | 3 | * | * | .*\.id[aq]$ | * | * |
| 8 | 4 | * | * | * | name="name"; value ~ ".*GLOBAL" | * |
| 9 | 5 | * | * | * | * | name="User-Agent"; len(value)>512 |

As part of a runtime process, candidate rules are obtained for a single matcher. An iterative approach is then used to combine candidate rules among multiple matchers.

For each matcher (e.g., column) in the signature table, the conditions (e.g., cells) involving that matcher are checked simultaneously (or at least substantially simultaneously accounting for processing and/or system (e.g., memory access) delay, for example) using a searching data structure. For example, when checking which string in different conditions (e.g., cells) is equal to A string X, a trie can be built in pre-computation and the string X can be identified in the trie to determine the match simultaneously (or at least substantially simultaneously).

Figure 5:
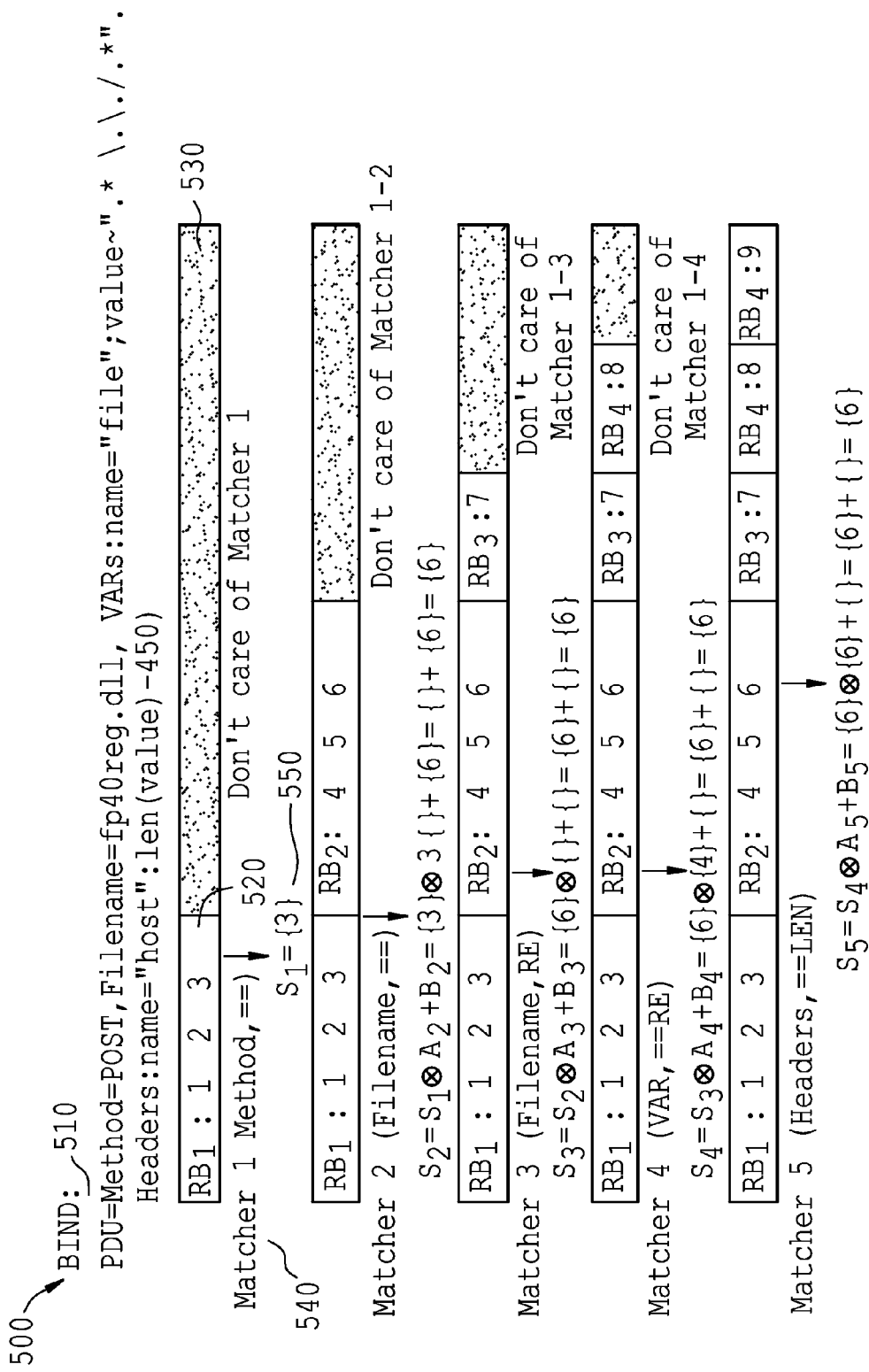
FIG. 5 illustrates an example rule ordering and candidate selection process.

FIG. 5 illustrates an example rule ordering and candidate selection process 500 for rules in Table 1. For a PDU 510, one or more rule blocks (RBs) 520 and "don't cares" 530 are provided for each of a plurality of matchers 540 to identify one or more sets of rule candidates $S_i$ 550. As shown in FIG. 5, for matcher 1 (method==) 540, the string "POST" is looked up in the trie to decide rule 3 matches. In Table 2, example implementations are described for all types of matchers.

TABLE 2

Typical implementations of different matchers.

| DataType | Operation | Implementation |
|---|---|---|
| number | exactly match | balanced binary search tree |
| number | range check | balanced binary search tree |
| string | exactly match | trie |
| string | regular expression | combined DFA |
| string | length checking | balanced binary search tree |

An exception is that, if in a signature the right operand of a matcher is a protocol field (e.g., a variable) rather than a constant, it is matched separately rather than using the implementations in Table 2. Nevertheless, the result can be added to the candidate set following the same candidate selection process. In the real world rulesets, such as from Snort and Cisco rulesets, such a case is rare and does not noticeably affect performance.

After matching a matcher 540, the results are iteratively combined with previous matchers together efficiently. $S_i$ is the set of rule candidates 550 after matching matcher $M_1 \ldots M_i$. For $S_i$, $RB_1 \ldots RB_i$ are of interest because the rules after $RB_i$ have wildcards for $M_1 \ldots M_i$. $S_1$ can be directly obtained by matching the arrived protocol field against $M_1$ on rule block $RB_1$. In general, the iteration $S_i = S_{i-1} \otimes A_i + B_i$ to obtain $S_i$ from $S_{i-1}$. After matching the corresponding protocol field against $M_i$, the rule candidate sets $A_i$ and $B_i$ are obtained. $A_i$ represents candidate(s) from $RB_1 \ldots RB_{i-1}$, e.g., the rule blocks 520 shared with previous matchers 540. $B_i$ represents candidates from $RB_i$, e.g., a rule block extended by $M_i$. Since $S_{i-1}$ is also from $RB_1 \ldots RB_{i-1}$, $S_{i-1}$ and $A_i$ are merged using a special operation $\otimes$. $\otimes$ is a "special" set intersection with wildcard support. For each element e in $S_{i-1}$, two ways lead it to $S_{i-1} \otimes A_i$: either e does not care $M_i$ (has a wildcard) or e in $A_i$. Since $B_i$ and $S_{i-1} \otimes A_i$ are from different rule blocks, they are mutually exclusive. $B_i$ can be appended to get $S_i$ (achieve set union +). In FIG. 5, the arrows show how rule candidate sets 550 $S_1$ to $S_5$ are obtained upon the corresponding protocol field arrives. The whole PDU 510 is given at the beginning of the figure.

In Algorithm 2, $|RB_{ij}|$ represents a number of rules in $RB_i$. A bitmap MAP encodes 0 if a cell in the signature table is a wildcard; otherwise 1 is encoded. To check whether an element in $A_i$ is set can be achieved in O(1) by a hash table or TCAM, or in $O(\log(|A_i|))$ by a balanced binary search tree. One optimization is that, if the candidate set from all signatures (T==N) is already empty, the matching is stopped before applying all the matchers.

```
Algorithm 2 depicts a runtime candidate selection process:
Algorithm 2 - CandidateSelection Runtime( )
  S ← φ; T ← 0;
  encode "don't care" information into bitmap MAP;
  For Matcher_i in AllMatchers
    Match Matcher_i and get A_i and B_i;
      T ← T + |RB_i|;
      S ← Otimes(S, A_i, Matcher_i, MAP);
      append B_i to S;
      If (S == φ And T == N) Return φ;
  Endfor
  Return S;
  Function Otimes(S, A, MID, MAP) //⊗ operator
    NS ←⊗;
    For RuleID in S
      If (MAP[RuleID][MID]==1)
        If (RuleID ∈ 2A) add RuleID to NS;
      Else
        add RuleID to NS;
      Endif
    Endfor
    Return NS;
```

Referring to the CS process of Algorithm 2 above, an iteration $S_i = S_{i-1} \otimes A_i + B_i$, $A_i$ reduces the size of $S_{i-1}$ by filtering out some elements, and $B_i$ enlarges the $S_{i-1}$ to get $S_i$. Because $S_{i-1} \otimes A_i$ and $B_i$ are mutually exclusive, appending $B_i$ to $S_i$ has negligible overhead. This shows another advantage of this example to decouple candidate set addition and deletion.

The main overhead of the iteration comes from $S_{i-1} \otimes A_i$, which is $O(|S_{i-1}|)$. Therefore, an average of $|S_i|(i \in [1, N-1])$ as a metric to optimize the speed. This average is denoted as $avg(|S_i|)$. As long as $avg(|S_i|)$ is managed to be small, overhead is small. $|B_i|$ can be used to bound the $avg(|S_i|)$.

$$|S_i| \leq \sum_{j=1}^{i} |B_j|,$$

so $$avg(|S_i|) \leq \sum_{j=1}^{N} \frac{N-j}{N-1} |B_j|.$$

The bound is not tight, but it provides a clue that the matchers at beginning are more crucial since their $|B_i|$ contribute more to $avg(|S_i|)$. In an example evaluation, it was found that avg $(|S_i|)<1.5$ and $\max(|S_i|)<8$ in rulesets and traces evaluated.

For N signatures defined on K matchers, in the worst case ruleset, an $avg(|S_i|)$ may have O(N) candidates, involving O(K×N) operations. However, based on observations, a matcher will usually only have no more than C candidates $((|A_i|+|B_i|) \leq C)$, where C is a small constant. In that case, O(K) speed can be achieved, indicating the CS algorithm can be very fast. This has been confirmed in scalability experiments described further below.

In general, putting more selective matchers upfront can improve performance. Suppose, for example, $M_j$ is not selective (e.g., $|A_j+B_j|=|A_j|+|B_j|$ is large. A large $B_j$ can be worse than a large $A_j$, since it enlarges $S_j$ and produces large overhead for the next iteration. By arranging $M_j$ later, some rules in $RB_j$ are covered by other matchers. Thus, $|B_j|$ is reduced.

Although matcher reordering can reduce avg($|S_i|$), matcher reordering can result in buffering overhead and increased memory usage per connection. If the matchers are matched according an order decided by the field arriving order, protocol fields do not need to be buffered. A single field can correspond to multiple matchers. The most selective matchers can be ordered first without additional buffering. In other cases, certain protocol fields are buffered in order to match their matchers later. Since buffering overhead influences performance as well and keeping memory usage per connection small is valuable, a reduction of avg($|S_i|$) is balanced against buffer usage. Here, a limited buffer size (BufLen) is assumed, and an attempt is made to reduce or minimize avg($|S_i|$). However, this problem is NP-Hard.

Given the problem is NP-Hard, a greedy algorithm (Algorithm 3) is described to improve the worst case performance as much as possible. Matchers are only reordered when necessary (e.g., the worst case $|B_i|$ larger than a predefined threshold MaxB and when the buffer size allows). A function estmaxB($M_i$) returns the worst case (e.g., largest) $|B_i|$ when $M_i$ is considered as the next matcher. EstmaxB($M_i$) can be calculated in pre-computation, for example.

Number fields can be buffered directly. However, buffering string fields with an unbounded length can be too costly. Alternatively, the matching result $A_i$ and $B_i$ can be buffered given its position i is known beforehand. Since $|A_i + B_i| \leq N$ and the worst case size can be determined in pre-computation, $A_i$ and $B_i$ can be buffered when the buffering overhead allows.

In conducting an example attack resiliency analysis, two possibilities are considered: attacks specific to a NetShield system and attacks general to any stateful NIDS/NIPS. Performance of NetShield is determined by a signature ruleset and a complexity of protocol parsing. In fact, attackers have no control over either the ruleset or the protocol design, but rather have an ability to generate the worst case traffic to slow down processing by introducing more candidates.

To show attack resilience, Algorithm 3 is demonstrated with MaxB=10 and BufLen=10 to cope. For WINRPC, three number fields are renumbered using a six-byte buffer. After reordering, it can be proven, even under the worst case traffic, that avg($|S_i|$) is bounded by a maximum number of vulnerabilities with the same universally unique identifier (UUID), because the UUID field is used by the signatures and is very selective. In an example evaluation, WINRPC ruleset avg ($|S_i|$)$\leq$3. For HTTP, it is hard to prove a bound. Example "worst case" traffic can be generated to evaluate an HTTP bound but to generate the worst case traffic is a NP-Hard problem. A greedy approach can be used to maximize the $|S_i|$ at each step. A result shows that approximate worst case traffic can achieve about 68.4% of the throughput of normal traces, which demonstrates that the CS algorithm works reasonably well under "worst case" traffic.

```
Algorithm 3 - MatcherOrdering( )
    OrderM ← φ;
    BUF ← φ;
    For M_i in AllMatchers
        While (BUF is not empty)
            Find M_j in BUF with minimum estmaxB(M_j);
            If (estmaxB(M_j) ≦ MaxB)
                remove M_j from BUF, and append M_j to OrderM;
            Else
                Break;
        Endif
        Endwhile
        If (estmaxB(M_i) ≦ MaxB)
            append M_i to OrderM;
        Else
            append M_i in BUF;
            While (len(BUF) > BufLen)
                FindM_j in BUF with minimum estmaxB(M_j);
                remove M_j from BUF, and append M_j to OrderM;
            Endwhile
        Endif
    EndFor
    Return OrderM;
```

Stateful NIDSes/NIPSes are subject to state holding attacks. Then, an evaluation metric is how many connections (e.g., states) can be sustained. Most payload inspection NIDS/NIPSes, including NetShield, create states for successful connections with application payloads. Thus, IP spoofing does not work in such environments. An example design uses at most 27 bytes/connection for HTTP and WINRPC traffic. This is even less than the memory usage of state-of-the-art regular expression-based approach eXtensible Markup Language (XML) Forms Architecture (XFA), which requires 36 bytes/connection for 863 Snort HTTP rules. Thus, the example design is capable of handling millions of connections and is robust to attacks.

Candidate selection can be refined in several ways. For example, a negative condition can be allowed. A signature can involve a negative condition on a matcher. For example, a signature requires that the regex "".*abc" cannot be matched on the HTTP filename field. For such cases, the signature can be put in $S_i$ by default, and removed if it is matched.

In some examples, a list of fields can be handled in candidate selection. In many protocols, protocol fields can form arrays or associative arrays. For these cases, the conditions in signatures can use "any" or "all" operators. For example, a condition indicates that all the lengths of directories in a URI should be smaller than 100. Another example involve checking if any of the lengths of directories is larger than 100. "All" can always be expressed by "not" and "any", for example. Thus, in an example design, "not" and "any" are modeled.

The "any" cases are common in vulnerability signatures. For ""any"" cases, each of the elements of an array is checked with a matcher to accumulate $A_i$ and $B_i$. Some rules may involve multiple "any" conditions on the same array that re to be met simultaneously or substantially simultaneously (e.g., an AND relationship). In that case, each such condition can be treated as a separate matcher, and the CS algorithm is used to merge them.

In some examples, mutually exclusive fields are accommodated. Matchers related to mutually exclusive fields can be treated as a group. If one of the mutually exclusive fields is present, the other fields will not appear. Thus, all candidates belonging to the other fields can be deleted. Then, a group of matchers associated with the deleted candidates is skipped and evaluation continues with the next matcher not in the deleted group.

Most simple multiple PDU protocols do not have transition loops in their protocol state machines. Therefore, the single PDU CS algorithm can be extended to multiple PDU protocols. Without transition loops, the fields arrive sequentially, which is similar to a single PDU case. For protocols with transition loops, an enhancement is made. For each transition loop, the protocol goes back to a previous state and re-sends certain PDUs. Checkpoints are used to save scenarios of the candidate selection process, so that when the process jumps back to an old state, the checkpoint can be restored to restart CS from the checkpoint. For a checkpoint, a candidate set $S_i$ of the last matcher of the previous PDU and the position of the buffer at that instant are saved.

Protocol parsing is used to recover protocol fields for vulnerability signature matching. However, manually building protocol parsers is tedious and error-prone. Certain examples provide UltraPAC, an efficient automated protocol parser generator. UltraPAC generates C++ code for protocol parsing, given a program-like protocol description. The generated parser is specially designed for signature matching and is much faster than the state of the art.

For the ease of description, some definitions are established: each PDU corresponds to a protocol parse tree (e.g., a concrete syntax tree), which is a hierarchy of protocol fields. The leaf nodes of the parse tree correspond to simple data objects, including numbers and strings. The inner nodes correspond to more complex data objects, such as arrays of numbers, strings, and/or or C-like "struct" or "union". Leaf nodes are defined as basic fields, and inner nodes are defined as compound fields.

BinPAC and GAPA are two major efforts towards building yacc-like tools for general purpose protocol parsing. Both use recursive descent parsers (top-down parsers). However, a special purpose protocol parsing problem is targeted—e.g., for signature matching. Therefore, three distinctions are made.

First, a parsed field is used once by the matching engine and never used again. The parser does not have to preserve a copy of the parsed field. Second, fields are parsed that are either directly related to the vulnerability signature matching (Type-I fields) or indirectly related to parsing Type-I fields (Type-II fields), e.g., a header.qdcount field in a DNS protocol that specifies how many question records the PDU has. Third, Type-I and Type-II fields are basic fields in dominant cases, as demonstrated in FIG. 2. This observation is further validated by studying the vulnerabilities targeted by Snort and related literature.

The BinPAC parser is faster than the GAPA parser, so analysis is focused on BinPAC. The major overhead is divided into three parts: (a) buffer management, a cost to copy network traffic into the buffer and expand/shrink buffer at runtime, (b) parse tree traversal, a cost to construct and take down tree nodes and recursive descent parsing function calling, and (c) protocol field extraction, a cost to compute field length, record starting and ending position, update parsing state, etc.

BinPAC is not optimal for special protocol parsing. Ideally, overhead (a) should be removed, since the parser only needs to record and return the starting and ending position of the protocol field, even in the rare case where one field is separated in several packets. Overhead (b) is also unnecessary because the parser does not need to construct the complete view of the protocol parse tree. A much simpler approach to search along the traffic for the wanted basic field is sufficient in dominant cases. When a compound field is needed in signature matching, it can be constructed from the basic ones. However, it happens very infrequently and does not affect the overall performance significantly. For overhead (c), the extraction of all compound fields can be eliminated due to the same reason.

Unfortunately, these overheads are by design inherent to BinPAC parser, and thus cannot be removed by implementation optimization. Designed for general purpose, BinPAC parser must handle the worst case where the whole protocol parse tree is required by other components in the system. As a result, it must preserve a copy of the parsed fields, traverse the protocol parse tree and parse all nodes.

A parsing state machine (PSM) is devised to eliminate the identified unnecessary overhead as much as possible. Eight popular protocols: HTTP, FTP, SMTP, eMule, BitTorrent, WINRPC, SNMP and DNS have been studied. Three common relationships are found among fields: sequential, branch and loop. Sequential fields appear in a PDU one after another in a fixed order. For fields with a branch relationship, one sequential field will appear. A condition called branch variable controls the branch. A loop field appears repeatedly in the PDU until a termination condition is fulfilled. In addition, Type-II fields can derive parsing variables that control the parsing process.

Figure 6:
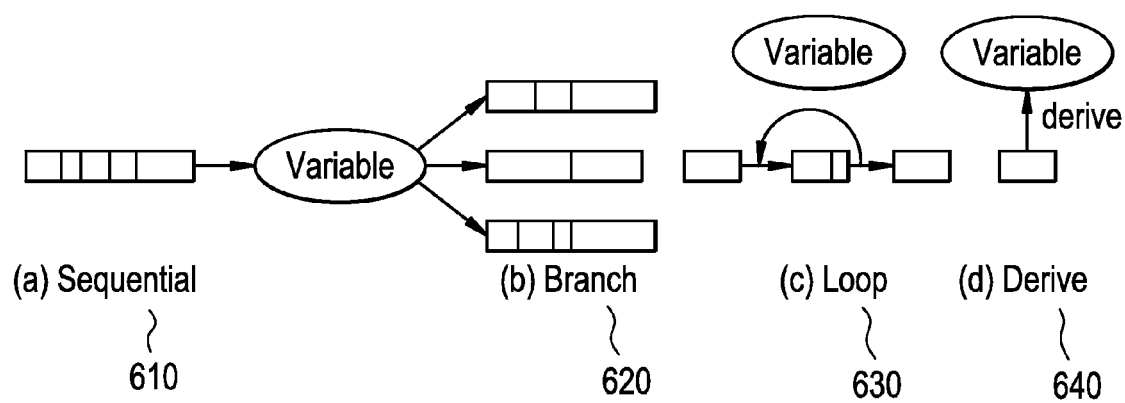
FIG. 6 illustrates building blocks of an example parsing state machine.

Based on these findings, a PSM is provided. A state is a basic field that is being parsed. A state transition marks an end of parsing a previous field and a start of parsing a next field in the PDU. Before quitting a state, parsing variables, if any, are derived. Four basic building blocks 612, 614, 616, 618 of a protocol parsing state machine (PSM) 610 are shown in FIG. 6. The PSM 610 is a combination of these basic building blocks 612, 614, 616, 618. Protocol semantics are context sensitive and demonstrate a common relationship among leaf nodes, for example.

Figure 7:
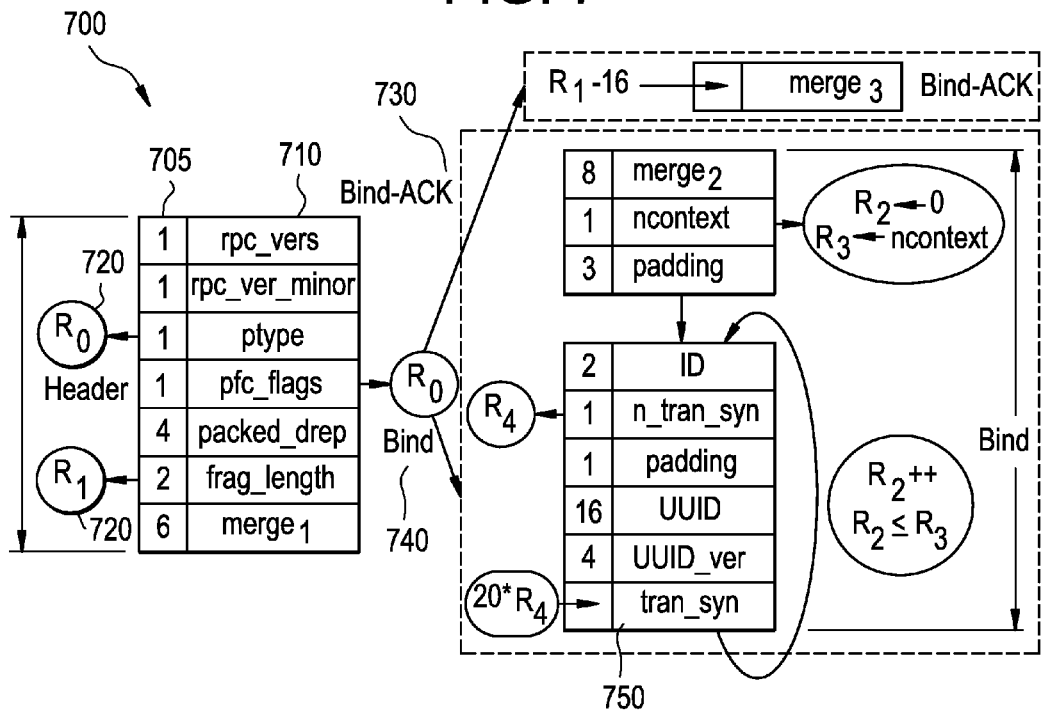
FIG. 7 illustrates an example parsing state machine.

FIG. 7 illustrates a simplified, example PSM 700 for a WINRPC protocol. Fields that are not related to Type-I and Type-II fields are merged as merge, fields to save space. As shown in FIG. 7, rectangles indicate states of the state machine 700 and $R_i$ represent parsing variables.

The parser continuously fetches the length of a current field and moves an offset pointer 705 in an input data segment 710 accordingly. For example, to parse a WINRPC header 710, the offset pointer 705 increases by 1, 1, 1, 1, 4, 2, 6 in each parsing step, respectively. Since p-type and frag_length are used as parsing variables, they are loaded into variables ($R_i$) 720. At 730, if ptype==BIND_ACK, the parser can directly jump over the remaining payload (field merge$_3$) in the PDU by frag_length minus 16 bytes. At 740, if ptype==BIND, parsing states 750 are traversed.

Figure 8:
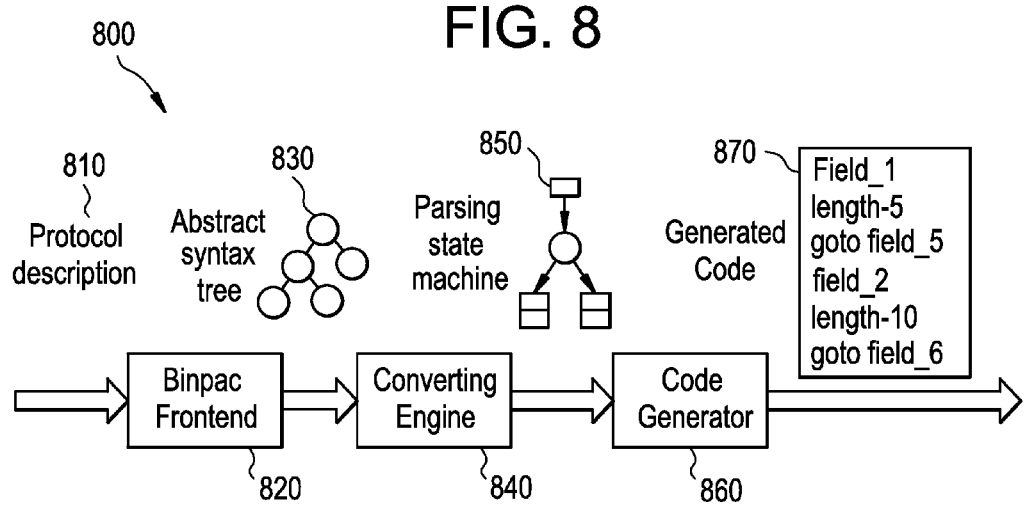
FIG. 8 illustrates an example parser generation workflow.

The frontend and language of a protocol parser, such as BinPAC, are leveraged and combined with a customized converting engine to produce the parsing state machine (PSM) for an input protocol. FIG. 8 shows a workflow 800 using an automated protocol parser generator, such as UltraPAC. Code generation 870 is apparent to one of ordinary skill in the art and is therefore not described further with respect to FIG. 8.

A parser frontend component 820 reads a program-like description 810 of a protocol format and constructs an abstract syntax tree (AST) 830 from the description 810. The AST 830 is a tree-like representation of abstracted protocol format. The AST 830 is distinct from a protocol parse tree. The AST 830 provides ways that a legal PDU can possibly be built. Approaches for PDU construction can be determined by a protocol format description. Conversely, a protocol parse tree states how a given PDU is assembled from basic fields. This is determined during the runtime of a parsing process.

A protocol parser, such as BinPAC, can be used to acquire the AST 830. BinPAC constructs the AST 830 of a protocol in memory before it generates C++ code for the parser. In certain examples, the AST is kept for further processing and the code generation part is discarded. Accordingly, the BinPAC language is kept for the protocol description.

A converting engine 840 further converts the AST 830 into a PSM 850. Pseudocode for this conversion is provided in Algorithm 4.

```
Algorithm 4 - ParsingStateMachineGeneration( )
S ← {root}
While ∃ n, n ∈ S and n is inner node
    children ← the set of n's children
    S ← S - n
    S ← S ∪ children
    If n is of RECORD type
        assign sequential ordering among children
    Elseif n is of CASE type
        assign branch ordering among children
        branch variable controls the branch
    Else
        next the subsequent node of n
        assign branch ordering between children and next
        array terminating condition controls the branch
    Endif
    add logic to derive parsing variable from n
Endwhile
```

In Algorithm 4, root is the root node of the AST, which represents the whole PDU. S is the internal node space maintained by UltraPAC. S contains all nodes that are to be processed. Record, Case and Array are the three possible types of a parent node. They indicate sequential, branch, and loop relationship among its children, respectively. At the end of each iteration, logic to derive parsing variables is added to the PSM, so that the actual values of the parsing variables can be determined during runtime using the logic. The iteration continues until the node space contains only leaf nodes in the AST.

Since UltraPAC supports sequential, branch and loop fields, it can essentially handle arbitrarily complex protocol format. One caveat is that AST might assign attributes to compound fields, whereas the PSM produced by UltraPAC handles only basic fields. This problem is tackled by breaking and distributing these attributes to proper children basic fields. Such breakup and distribution is feasible because the set of children fields is determined in the AST. In addition, after studying the BinPAC language, it is found that supported attributes can be properly distributed, while preserving the original functionality.

In certain examples, further improvements can be made, such as multiple layer parsing and combination of unnecessary fields. One application protocol may tunnel through another application protocol and use the latter application protocol as a transport layer. One PDU body can be included in multiple messages. Therefore, application layer reassembly is used for the PDU body. For example, by treating WINRPC as two sub-protocols and using two layers of PSM, reassembly can be solved. Once the first layer parses the header, the second layer is called to parse the partial body and save the parsing states as well as the offset pointer. Then, after the next message arrives, parsing continues with the remaining part of the PDU.

Alternatively or in addition, a data flow analysis can be adopted to combine the consecutive fields that are neither Type-I nor Type-II fields into one field if possible.

In certain examples, a core engine is implemented to provide parsing and matching. UltraPAC can be implemented partially based on BinPAC. As shown in FIG. 8, the BinPAC language and code are reused to construct the abstract syntax tree 830. Accordingly, the protocol specification distributed with BinPAC is used with minor revision. The converting engine 840 and code generator 860 can be implemented with about 3,000 lines of C/C++ code, for example.

Three types of matchers and the CS algorithm can be implemented with about 6,800 lines of C/C++ code, for example. A path-compressed trie can be implemented for string exact matching and binary search can be leveraged for integer range checking For regex matching, Ragel can be used for regex compilation while other code is written for regex matching.

Besides applying the full-featured BinPAC language for protocol parsing, a language can be created to describe symbolic predicates for writing signatures. A rule compiler can be implemented in Python with roughly 2,800 lines of code, for example.

A signature language has been designed to be simple, intuitive and sufficient. Vulnerabilities targeted by the Snort and Cisco rulesets are used to determine language features that meet real-world needs.

In certain examples, three types of Boolean operators are supported: &&, ||, and !. There are two basic data types: string and number. For the number type (e.g., integer), the following relationship operations are supported: ==, >, <, >=, <=, and !=. For the string type, certain examples support len( ) and match re( ) functions and an exact matching == comparison.

In addition, arrays and associative arrays are enabled. For instance, dirs is an array of directories in the URI. Any(dirs) is used to represent any element of the array. The len( ) function is used to get a length of an array. For associative arrays, a mapping operation is supported. For example, len (HTTP_Headers["Host"])>300 means that if the string length of the value corresponding to the key "host" in the HTTP_Headers associative array is larger than 300, the condition is true.

Figure 9:
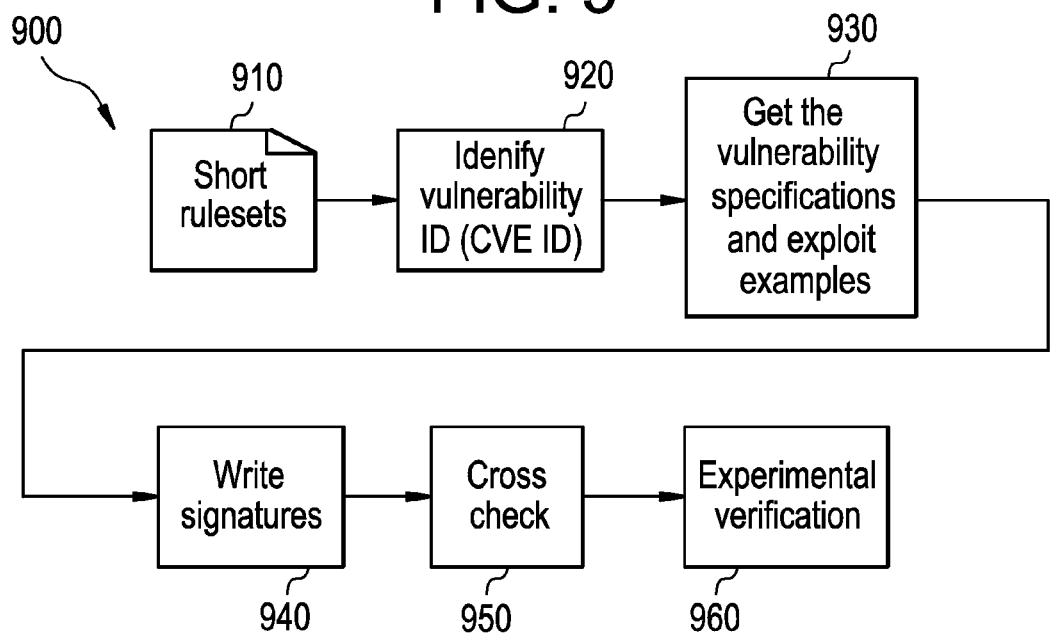
FIG. 9 illustrates an example vulnerability signature creation.

While it would be more objective to evaluate an approach with standardized vulnerability signature rulesets, unfortunately, given no existing vulnerability rulesets or open source vulnerability signature generator available, vulnerability rulesets are manually created for evaluation. To figure out which vulnerabilities should be included in the ruleset, vulnerabilities that Snort tries to detect are targeted. A focus is placed on HTTP and WINRPC because they correspond to the two largest rule subsets of Snort ruleset. 794 HTTP and 45 WINRPC vulnerability signatures are manually created based on vulnerability information of 973 HTTP and 3,519 WINRPC Snort rules (November 2007 version), following the workflow 900 shown in FIG. 9. At 920, vulnerability CVE IDs of Snort rules 910 are identified. Each CVE ID corresponds to a vulnerability, so a rule is written for each CVE ID. At 930, vulnerability specifications and exploit samples are collected from various online vulnerability database and hacker forums. At 940, signature are written. At 950, signatures written by different people are cross checked. At 960, example verification of results found 94.8% agreements. For the remaining 5.2% debatable ones, a vulnerable host is set up, exploits are modified, and signatures are further refined.

An example software NIDS prototype was built to demonstrate NetShield. existing libraries were leveraged to implement traffic capture (e.g., using Winpcap), TCP reassembly (e.g., using Libnids), and protocol identification (e.g., using port number for simplicity). The prototype has roughly 17,700 lines of code in C/C++ and Python runs on Microsoft Windows®, for example.

Performance of NetShield prototype is evaluated by measuring throughput on different traces across different protocols, networks and time. Results show that NetShield can achieve high throughput. For 794 HTTP vulnerability signatures, 11+Gbps core engine throughput can be achieved on an eight-core machine. An UltraPAC generated parsers are about 3~12 times faster than those of BinPAC. Candidate selection based matching is 8.8 to 11.7 times faster than sequential matching for 794 signatures.

Additionally, results confirm that NetShield achieves good accuracy. For example, three WINRPC vulnerabilities Snort tries to detect, Bugtraq 8205, Bugtraq 6005 and MS08-067 (exploited by the recent Conficker worm), are evaluated. Some of the bit patterns in Snort signature are not related to vulnerabilities. After changing the bit pattern in the exploit code, the exploit still works, but Snort cannot detect the attack and thus has false negatives. If the bit patterns are included in normal requests, Snort will report the requests as false positives. On the other hand, NetShield detects all the polymorphic variants created from the real exploits accurately. Furthermore, a 10-minute "clean" HTTP trace from U1 (1.2 GB) was evaluated. In that period, Snort generates 42 alerts while NetShield generates zero alert. Those alerts were manually checked and found to be false positives.

When a vulnerability logic is deeply embedded in the application, it is hard to directly use the protocol semantic information to describe it. During the parsing, a function can be defined to partially reproduce application logic. For example, Bugtraq ID 599 has a buffer overflow vulnerability in wu-ftpd 2.5. If a deep file transfer protocol (FTP) path is created by making new directories recursively, the buffer will be overflowed. However, neither the path nor the path length is a protocol field or a parsing variable. To solve this problem, a customized function can be defined and inserted into the parser to calculate path length. The result can be used as if it were a protocol field. In this way, extra computational overhead can be borne while still detecting vulnerabilities accurately. In all vulnerabilities studied, including those mentioned in other papers, there are only a few such cases.

Another problem is that, when applying vulnerability signatures at network level, ambiguities can arise if software variances running on the hosts are not known. It is possible that a flow can trigger a vulnerability on variance A but not B. One solution is to actively map the software variance and their versions on the enterprise network. In certain examples, even without knowing the exact version, vulnerability signatures of popular software will not cause false positives, since normal traffic will not trigger the vulnerability; otherwise the software will crash often and cannot be popular.

Furthermore, different software variances can interpret the protocol slightly differently, which might cause parsing ambiguity. Similarly, an active mapping approach can help in this case as well. In certain examples, NetShield provides a first systematic design of a vulnerability signature based parsing and matching engine. A state machine based parsing execution model and an CS algorithm are provided for fast matching on a large vulnerability ruleset. A real trace evaluation demonstrates that NetShield achieves similar speed to that of current regular expression based NIDS/NIPS while offering much better accuracy.

Figure 10:
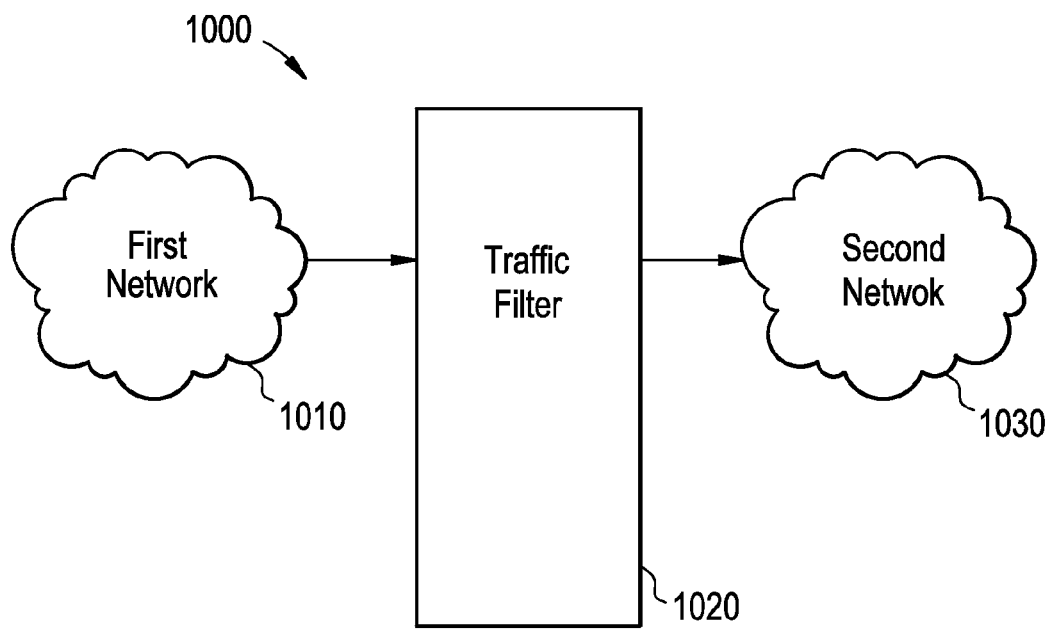
FIG. 10 illustrates an example network monitoring system including network vulnerability detection for network elements.

FIG. 10 illustrates an example network monitoring system 1000 including network vulnerability detection for network elements. The system 1000 includes a first network 1010, a traffic filter 1020, and a second network 1030. As shown in the example of FIG. 10, traffic 1005 travels in the first network 1010 (e.g., the Internet) to a destination in the second network 1030 (e.g., a local area network (LAN) such as a private or internal network). The traffic 1005 is stopped and analyzed by the traffic filter 1020, which blocks the traffic 1005 or allows it to pass into the second network 1030, for example. The traffic filter 1020 can include a network intrusion detection/prevention system, for example. The traffic filter 1020 captures and reassembles network data packets into messages for vulnerability analysis, for example.

The traffic filter 1020 can include one or more sub-components such as the traffic capture module 410, TCP reassembly module 420, protocol identification module 430, core engine 440 (including protocol parser 442, individual matchers 444, and candidate selection algorithm 446), protocol specification 450, parser generator 460, vulnerability ruleset 470, and rule compiler 480 described with respect to FIG. 4 above. The traffic filter 1020 classifies a message according to an application protocol and generates a protocol parser based on a protocol specification corresponding to the identified application protocol. Based on the protocol fields output by parsing, vulnerability signatures for the application protocol are matched in parallel according to a corresponding vulnerability ruleset. Traffic is stopped or released depending upon the matching result. For example, if protocol fields from a message match a vulnerability signature, that message is prevented from reaching its destination in the second network 1030. Otherwise, the message can resume transmission in the second network 1030.

Figure 11:
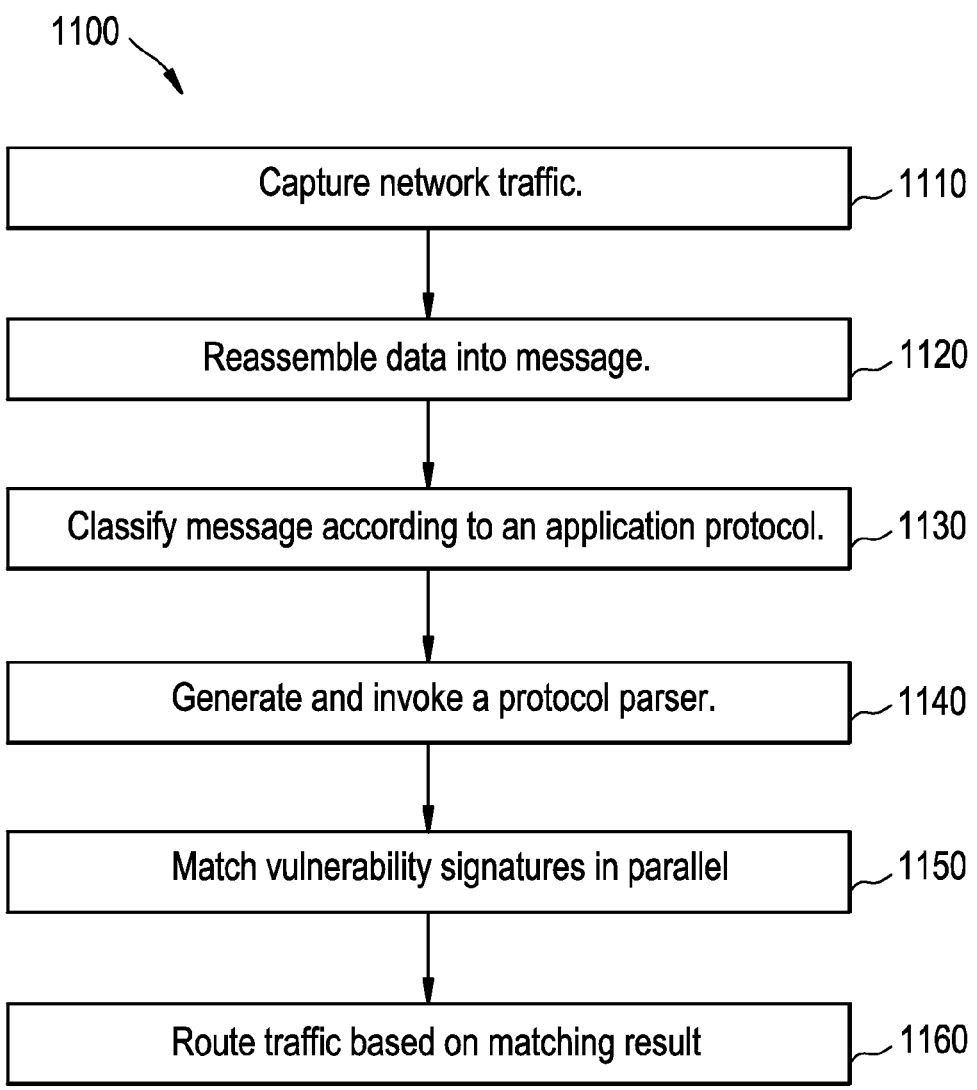
FIG. 11 illustrates a flow diagram for a method for semantics-based vulnerability signature matching.

FIG. 11 illustrates a flow diagram for a method 1100 for semantics-based vulnerability signature matching. FIG. 11 depicts an example flow diagram representative of processes that can be implemented using, for example, computer readable instructions that can be used to facilitate message parsing and vulnerability analysis. The example processes of FIG. 11 can be performed using a processor, a controller and/or any other suitable processing device. For example, the example processes of FIG. 11 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 11 can be implemented using coded instructions (e.g., computer readable instructions) stored on a non-transitory computer readable medium such as a flash memory, a read-only memory (ROM), a random-access memory (RAM), a CD, a DVD, a Blu-ray, a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 11 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 11 can be implemented manually or as any combination(s) of any of the foregoing techniques, for example, any combination of firmware, software, discrete logic and/or hardware. Further, although the example processes of FIG. 11 are described with reference to the flow diagram of FIG. 11, other methods of implementing the processes of FIG. 11 may be employed. For example, the order of execution of the blocks can be changed, and/or some of the blocks described may be changed, eliminated, sub-divided, or combined. Additionally, any or all of the example processes of FIG. 11 can be performed sequentially and/or in parallel by, for example, separate processing threads, processors, devices, discrete logic, circuits, etc.

Turning to the method 1100, at 1110, network traffic is captured. For example, data packets intended for a node in a network are intercepted and captured before delivery to the target node. At 1120, message components or fragments are reassembled into a data message. For example, captured data packets are TCP reassembled into a message.

At 1130, the message is classified according to an application protocol. For example, a captured message can be classified according to a simple mail transfer protocol (SMTP). At 1140, based on a protocol specification corresponding to the identified application protocol, a protocol parser is generated and invoked. At 1150, based on the protocol fields output by parsing, vulnerability signatures for the application protocol are matched in parallel according to a corresponding vulnerability ruleset. At 1160, traffic is stopped or released depending upon the matching result. For example, if protocol fields from a message match a vulnerability signature, that message is prevented from reaching its destination.

As described herein, the method 1100 can be implemented using a handheld and/or other mobile device in one or more combinations of hardware, software, and/or firmware, for example. The method 1100 can operate with the mobile device in conjunction with one or more external systems. One or more components of the method 1100 can be reordered, eliminated, and/or repeated based on a particular implementation, for example.

Figure 12:
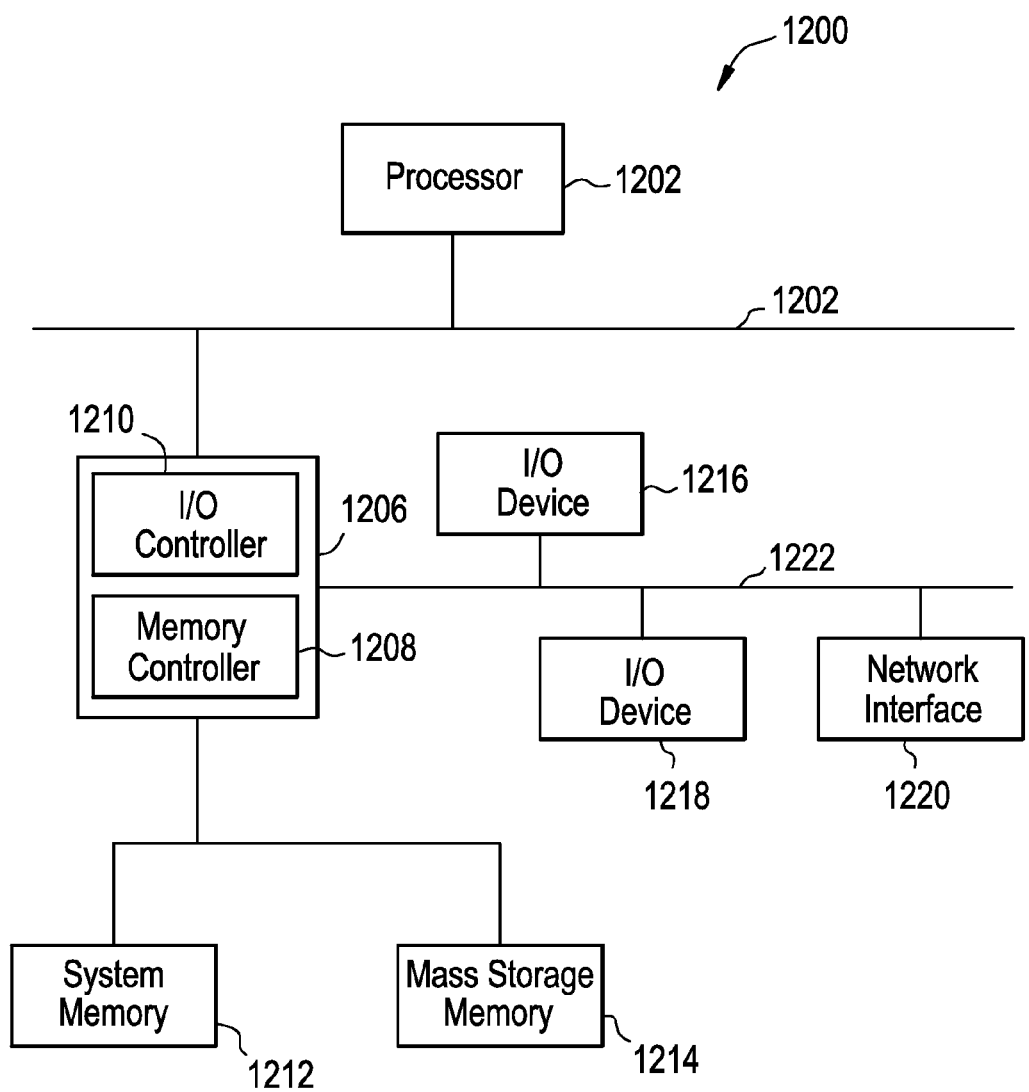
FIG. 12 is a block diagram of an example processor system that can be used to implement the systems, apparatus, and methods described herein.

FIG. 12 is a block diagram of an example processor system 1210 that may be used to implement the systems, apparatus, and methods described herein. As shown in FIG. 12, the processor system 1210 includes a processor 1212 that is coupled to an interconnection bus 1214. The processor 1212 may be any suitable processor, processing unit or microprocessor. Although not shown in FIG. 12, the system 1210 may be a multi-processor system and, thus, may include one or more additional processors that are identical or similar to the processor 1212 and that are communicatively coupled to the interconnection bus 1214.

The processor 1212 of FIG. 12 is coupled to a chipset 1218, which includes a memory controller 1220 and an input/output (I/O) controller 1222. As is well known, a chipset typically provides I/O and memory management functions as well as a plurality of general purpose and/or special purpose registers, timers, etc. that are accessible or used by one or more processors coupled to the chipset 1218. The memory controller 1220 performs functions that enable the processor 1212 (or processors if there are multiple processors) to access a system memory 1224 and a mass storage memory 1225.

The system memory 1224 may include any desired type of volatile and/or non-volatile memory such as, for example, static random access memory (SRAM), dynamic random access memory (DRAM), flash memory, read-only memory (ROM), etc. The mass storage memory 1225 may include any desired type of mass storage device including hard disk drives, optical drives, tape storage devices, etc.

The I/O controller 1222 performs functions that enable the processor 1212 to communicate with peripheral input/output (I/O) devices 1226 and 1228 and a network interface 1230 via an I/O bus 1232. The I/O devices 1226 and 1228 may be any desired type of I/O device such as, for example, a keyboard, a video display or monitor, a mouse, etc. The network interface 1230 may be, for example, an Ethernet device, an asynchronous transfer mode (ATM) device, an 802.11 device, a DSL modem, a cable modem, a cellular modem, etc. that enables the processor system 1210 to communicate with another processor system.

While the memory controller 1220 and the I/O controller 1222 are depicted in FIG. 12 as separate blocks within the chipset 1218, the functions performed by these blocks may be integrated within a single semiconductor circuit or may be implemented using two or more separate integrated circuits.

Thus, certain examples provide multiple vulnerable signature matching (VSM). Certain examples provide parallel VSM using a protocol parsing state machine. Each state represent a protocol field, and parsing variables control the flow of the state machine through the protocol fields. The parsing state machine can be automatically generated based on a protocol specification, for example. Certain examples provide fast full protocol parsing for vulnerability signatures.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Some or all of the system, apparatus, and/or article of manufacture components described above, or parts thereof, can be implemented using instructions, code, and/or other software and/or firmware, etc. stored on a machine accessible or readable medium and executable by, for example, a processor system. When any of the appended claims are read to cover a purely software and/or firmware implementation, at least one of the components is hereby expressly defined to include a tangible medium such as a memory, DVD, CD, Blu-ray, etc. storing the software and/or firmware.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A computer-implemented method for network intrusion detection, said method comprising:
   capturing a data message;
   invoking a protocol parser to extract content of a protocol field from the data message;
   constructing a signature table, where each row of the signature table represents a vulnerability signature, each column of the signature table represents a protocol field to be matched, and each cell of the signature table represents how the corresponding field is matched on the corresponding vulnerability signature;
   for each column in the signature table, examining the contents of the protocol field against corresponding entries for all vulnerability signatures in the signature table and labelling each vulnerability signature that matches the contents of the protocol field as a candidate signature;
   iteratively combining candidate signatures from different columns to produce a final matching outcome; and
   detecting an unwanted network intrusion based on the final matching outcome.

2. The method of claim 1, further comprising classifying the data message according to an application protocol.

3. The method of claim 2, further comprising generating the protocol parser according to the application protocol.

4. The method of claim 1, further comprising routing the data message based on the outcome of the matching.

5. The method of claim 1, wherein the protocol parser conducts multiple layer parsing using a multiple layer parsing state machine.

6. The method of claim 1, wherein the protocol parser conducts data flow analysis to merge consecutive fields that are not Type-I or Type-II fields.

7. The method of claim 1, wherein iteratively combining further comprises determining a match order to order more selective columns before less selective columns in determining a final matching outcome.

8. A vulnerability-based network intrusion detection/prevention system comprising:
   a processor configured to implement:
   a protocol parser including a parsing state machine to extract content of a protocol field from a protocol data unit according to an associated application protocol specification; and
   a matching engine configured to:
      construct a signature table, where each row of the signature table represents a vulnerability signature, each column of the signature table represents a protocol field to be matched, and each cell of the signature table represents how the corresponding field is matched on the corresponding vulnerability signature, the matching engine configured to, for each column in the signature table, examine the contents of the protocol field against corresponding entries for all vulnerability signatures in the signature table and label each vulnerability signature that matches the contents of the protocol field as a candidate signature;
      iteratively combine candidate signatures from different columns to produce a final matching outcome; and
      detect an unwanted network intrusion based on the final matching outcome.

9. The system of claim 8, further comprising an automated parser generator to generate code for the protocol parser according to the associated application protocol specification.

10. The system of claim 8, wherein the protocol parser comprises a multiple layer parsing state machine to perform multiple layer parsing of a protocol data unit.

11. The system of claim 8, wherein the protocol parser conducts data flow analysis to merge consecutive fields of the protocol data unit that are not Type-I or Type-II fields.

12. The system of claim 8, wherein iteratively combining further comprises determining a match order to order more selective columns before less selective columns in determining a final matching outcome.

13. The system of claim 8, further comprising a rule compiler to compile rules from a vulnerability ruleset for use by the matching engine.

14. The system of claim 8, wherein the protocol parser outputs a plurality of protocol fields from the protocol data unit based on the associated application protocol specification and the matching engine performs an incremental matching process when a parsed field is received from the protocol parser in a pipelined fashion.

15. A non-transitory computer-readable storage medium having a set of instructions stored thereon which, when executed, instruct a processor to implement a vulnerability-based network intrusion detection system comprising:
a protocol parser including a parsing state machine to extract content of a protocol field from a protocol data unit according to an associated application protocol specification; and
a matching engine configured to:
construct a signature table, where each row of the signature table represents a vulnerability signature, each column of the signature table represents a protocol field to be matched, and each cell of the signature table represents how the corresponding field is matched on the corresponding vulnerability signature, the matching engine configured to, for each column in the signature table, examine the contents of the protocol field against corresponding entries for all vulnerability signatures in the signature table and label each vulnerability signature that matches the contents of the protocol field as a candidate signature;
iteratively combine candidate signatures from different columns to produce a final matching outcome; and
detect an unwanted network intrusion based on the final matching outcome.

16. The computer-readable storage medium of claim 15, further comprising an automated parser generator to generate code for the protocol parser according to the associated application protocol specification.

17. The computer-readable storage medium of claim 15, wherein the protocol parser comprises a multiple layer parsing state machine to perform multiple layer parsing of a protocol data unit.

18. The computer-readable storage medium of claim 15, wherein iteratively combining further comprises determining a match order to order more selective columns before less selective columns in determining a final matching outcome.

19. The computer-readable storage medium of claim 15, further comprising a rule compiler to compile rules from a vulnerability ruleset for use by the matching engine.

20. The computer-readable storage medium of claim 15, wherein the protocol parser outputs a plurality of protocol fields from the protocol data unit based on the associated application protocol specification and the matching engine performs an incremental matching process when a parsed field is received from the protocol parser in a pipelined fashion.

* * * * *